Feb. 28, 1956  F. W. COFFING  2,736,408
CLUTCH AND BRAKE FOR A HOIST
Filed July 7, 1952  2 Sheets-Sheet 1
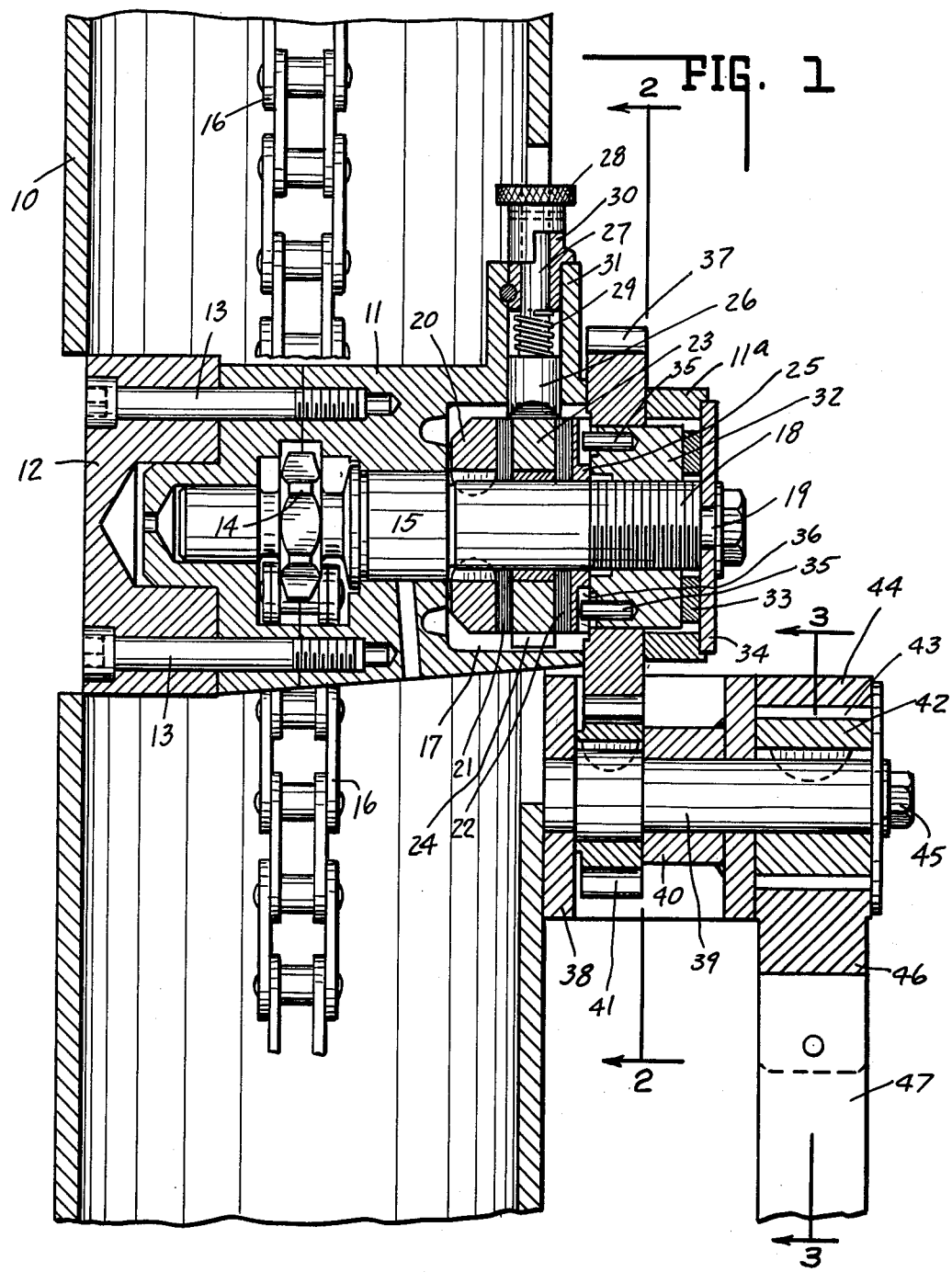
INVENTOR.
FREDRICK W. COFFING.
BY
Lockwood, Galt, Woodard & Smith.
ATTORNEYS.

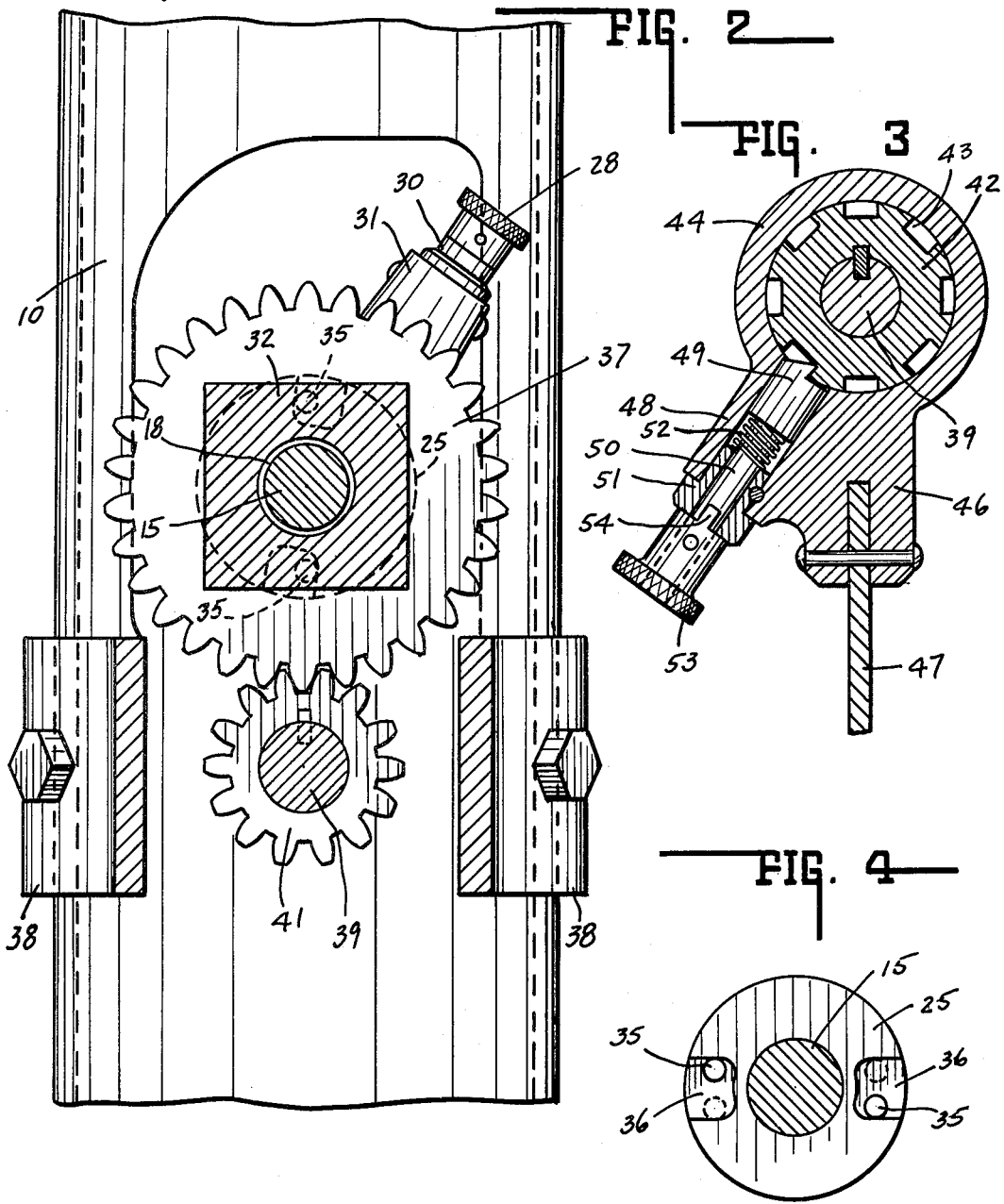

United States Patent Office 2,736,408
Patented Feb. 28, 1956

2,736,408

CLUTCH AND BRAKE FOR A HOIST

Fredrick W. Coffing, Danville, Ill., assignor, by mesne assignments, to Duff-Norton Company, Pittsburgh, Pa., a corporation of Pennsylvania Application July 7, 1952, Serial No. 297,513

2 Claims. (Cl. 192—16)

This invention relates to a hoist structure including that type adapted for use as a self-braking derrick winch, puller or the like.

The object of the invention is to provide a self-braking clutch controlled hoist structure or derrick winch having an outboard offset load pawl and operating handle operably connected with a braking clutch through reduction gearing for driving the load wheel through such clutch to substantially increase the lifting or pulling power of the hoist.

A feature of the invention resides in the outboard or offset arrangement of the load handle for permitting of unobstructed movement thereof, both in the operation of the hoist structure and the angular positioning of the load handle relative thereto.

A further feature of the invention resides in the above-described arrangement wherein there is provided a lost motion action between the load handle controlled elements of the hoist structure and clutch members.

The full nature of the invention will be understood from the accompanying drawings and the following description and claims:

Fig. 1 is a central vertical section through a portion of the hoist with parts broken away and parts in elevation.

Fig. 2 is a section taken on the line 2—2 of Fig. 1.

Fig. 3 is a section taken on the line 3—3 of Fig. 1.

Fig. 4 is a plan view of the lost motion clutching washer.

In the drawings there is disclosed a hoist structure which, in the form herein illustrated, is particularly adaptable as a self-braking derrick winch comprising a tubular housing 10 having mounted diametrically thereof a hub 11 formed in sections including a cap portion 12 and secured together by the tie bolts 13.

Said hub is provided with a central opening in which a sprocket type load wheel 14 is mounted carried by a main or driven shaft 15 rotatably supported in spaced bearing portions of the hub 11. Whereas said load wheel 14 is shown herein as mounting a load carrying sprocket chain 16, it may be of any other type or configuration, such as a spool for carrying or winding a tape, or with a peripheral formation for adapting it to a log chain, as is well known in the art.

The operating end of the shaft 15 extends outwardly through and beyond a cupped portion of the hub forming a clutch housing 17. Beyond that portion of the shaft embraced within the clutch housing it is provided with a series of screw threads 18, its outer end being internally threaded to receive an end locking bolt 19.

Within the clutch housing 17 there is keyed to the shaft a load flange member 20. In abutting frictional engagement therewith there is provided an inner clutch disk member 21 surrounding and freely rotatable relative to the shaft and flange member 20. Spaced from the member 21 there is an outer clutch disk member 22 similarly mounted upon and freely rotated about the shaft. Between said clutch members there is a ratchet member 23 having peripheral ratchet teeth 24, surrounding said shaft and supported thereby for free rotation relative thereto. Abutting and engageable with the outer face of the outer clutch disk member 22 there is a clutching washer 25. Said above-described members comprise a disk clutch unit through which the shaft 15 and load wheel 14 are driven.

In association with the ratchet member 24 there is provided a holding pawl 26 slidable in and out of ratchet tooth engagement through the medium of a stem 27 terminating in an operating knob 28. Said stem and pawl are biased into load holding position by a compression spring 29 and are slidably movable to different positions in a guide sleeve 30 mounted within a boss 31 extending radially from and integral with the hub 11. Said sleeve is so formed that the holding pawl may be retracted from ratchet engagement and locked into retracted position by a rotative movement in the manner well understood in the art.

Threaded upon the threads 18 of the shaft 15 there is a nut 32 adapted for axial displacement thereby upon rotation. Said nut is limited in its axial displacement in one direction by a washer 33 and the cap plate 34 secured over the end of the hub sleeve 11a by the nut locking bolt 19. The inner face of the nut is mounted to abut the outer face of the clutching washer 25, and carries one or more actuating pins 35 positioned to extend into registering recesses 36 formed on the abutting face of the clutching washer 25. Said recesses are peripherally elongated to more than twice the diameter of the pin seating therein to permit of a limited free play or angular displacement between the nut 32 and the clutching washer 25. At the end of the free play or angular displacement of pin 35 one or the other opposed shoulders formed by the recess would cause the nut to drive the washer in one or the other direction.

The nut 32 is shown with a square periphery to receive and mount thereabout a driving gear 37 which is axially slidable thereon. Mounted upon the housing 10 in axial offset relation to the hub 11 and the gear 37, there is provided an outwardly extending mounting frame 38 supporting an offset auxiliary driving shaft 39 rotatably supported on a bearing 40. The inner end of said shaft adjacent the housing 10 carries a pinion 41 keyed thereto and positioned to mesh with the gear 37, the pinion being of substantially less diameter than the gear. Keyed to the outer end of the shaft 39 offset from and beyond the end of the driven shaft 15 and nut 32, there is provided a ratchet wheel 42 having a series of peripherally spaced squared recesses 43 forming the ratchet teeth. Said ratchet wheel is enclosed within a housing 44 and secured on its shaft by an end locking bolt and associated washer 45. The housing 44 carries an extension 46 to which a load operating handle 47 is secured.

The extension 46 also embraces a boss 48 in which there is a slidably mounted load pawl 49. Said load pawl is mounted on a stem 50 slidable in a sleeve 51 and is normally biased into ratchet tooth engagement with the wheel 42 through a compression spring 52. The stem 50 mounts a knob 53 which carries a locking key 54 seatable in a corresponding recess in the sleeve 51. This arrangement is such that by pulling the stem and pawl outwardly so that the key 54 is free of the slot, against tension of the spring 52, the pawl may be rotated 180 degrees to reverse position. Thus, in one position, as illustrated in Fig. 2, it will ratchet over the teeth of the ratchet wheel when the handle 47 is swung in clockwise direction and engage and drive the wheel when swung counterclockwise. Upon a 180 degrees reversal, said pawl will rotate the wheel when the handle is swung clockwise and ratchet over the wheel when swung counterclockwise.

In operation, with the pawl 49 in the position illustrated, movement of the handle 47 counterclockwise will rotate the ratchet wheel 42 in the same direction, correspondingly rotating the pinion 41 in the same direction. The pinion 41 will drive the gear 37 in a counterclockwise direction, rotating it about the threads 18 of the shaft 15. Such rotation will screw the nut inwardly against the clutching washer 25 without rotating said washer, through the free play of the actuating pins 35 within the recesses 36. This action will cause such axial displacement of the nut and washer as to render the clutching members effective to frictionally clutch the nut through the washer and clutch members with the shaft 15 for rotating the load wheel 14. During successive movements of the operating handle 47 the load will be held in operative position by the holding pawl 26 engaging the ratchet member 24 through which the clutching power is transmitted.

For lowering the load, the load pawl 49 is reversed whereby the ratchet wheel 41 will be rotated in the reverse or clockwise direction. Through the reduction gearing, pinion 41 and driving gear 37, the nut 32 will be unthreaded or axially displaced in the opposite direction, causing the pins 35 to move through their lost motion movement to engage the opposed shoulders of the recesses 36, whereupon the clutching washer will be positively rotated in a direction to unfreeze the clutching members. A slight backing off of the nut will cause slippage of the clutch members with a self braking action to permit controlled lowering of the load. Complete backing off will release the load and permit of a free running action.

By reason of the outboard or offset relation of the ratchet and load pawl, the handle may be swung to any desired angular position for operation upon the withdrawal of the load pawl 49 from tooth engagement against tension of the spring 52. The said handle is also free to be rotated one entire revolution more or less without interference by the operating structure. Furthermore, through various ratios in the reduction gearing as between the pinion 41 and gear 37, the operating load may be greatly increased without change in the simplicity and operation of the hoist structure.

The invention claimed is:

1. A hoist structure of the character described including a housing, a main shaft carrying a load wheel having its bearings in said housing, said shaft having an extension terminating in a threaded portion, disk clutch members carried by said shaft extension including a ratchet member, a holding pawl on said housing normally biased to load holding engagement with said ratchet member, a clutching washer in face abutting engagement with one of said members and having a notch provided in its exposed face, a clutch controlling nut threaded on the threaded portion of said shaft for axial displacement into and out of shaft clutching engagement upon rotation thereof, one face of said nut abutting said washer and having a washer actuating pin engaging in the notch thereof to permit free play and limited angular displacement therebetween, a driving gear slidably mounted on said nut externally of said housing, an auxiliary shaft supported on said housing in axial and radial offset relation to said main shaft, a pinion secured to said auxiliary shaft in meshing engagement with said gear, a ratchet wheel secured to said auxiliary shaft, and a handle operated load pawl in driving engagement with said ratchet wheel.

2. A hoist structure of the character described including a housing, a main shaft carrying a load wheel having its bearings in said housing, said shaft having an extension terminating in a threaded portion, disk clutch members carried by said shaft extension including a ratchet member, a holding pawl on said housing normally biased to load holding engagement with said ratchet member, a clutching washer in face abutting engagement with one of said members and having a peripherally elongated notch provided in its exposed face, a clutch controlling nut threaded on the threaded portion of said shaft for axial displacement into and out of shaft clutching engagement upon rotation thereof, one face of said nut abutting said washer and having a washer actuating pin engaging in the notch thereof to permit free play and limited angular displacement therebetween, a ratchet wheel having a driving connection with said nut, and a handle operated load pawl in driving engagement with said ratchet wheel.

References Cited in the file of this patent

UNITED STATES PATENTS

| | | |
|---|---|---|
| 1,277,218 | Kalbach | Aug. 27, 1918 |
| 2,243,361 | Stahl | May 27, 1941 |

FOREIGN PATENTS

| | | |
|---|---|---|
| 594,694 | Germany | Mar. 21, 1934 |